United States Patent
Gareiss et al.

(10) Patent No.: US 6,184,282 B1
(45) Date of Patent: *Feb. 6, 2001

(54) FLAMEPROOF POLYAMIDE MOULDING COMPOUNDS CONTAINING MELAMINE CYANURATE

(75) Inventors: Brigitte Gareiss, Obersülzen; Heiner Görrissen, Ludwigshafen; Karlheinz Ulmerich, Carlsberg; Harald Lauke, Mannheim, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/029,635

(22) PCT Filed: Aug. 29, 1996

(86) PCT No.: PCT/EP96/03792

§ 371 Date: Mar. 4, 1998

§ 102(e) Date: Mar. 4, 1998

(87) PCT Pub. No.: WO97/09377

PCT Pub. Date: Mar. 13, 1997

(30) Foreign Application Priority Data

Sep. 5, 1995 (DE) ............................................. 195 32 720

(51) Int. Cl.$^7$ ................................ C08J 5/10; C08K 3/34; C08L 77/00
(52) U.S. Cl. .......................... 524/493; 524/101; 524/413; 524/514; 524/496
(58) Field of Search ..................................... 524/100, 101, 524/492, 493, 494, 495, 496, 514, 413

(56) References Cited

U.S. PATENT DOCUMENTS

| | | | |
|---|---|---|---|
| 4,552,912 | 11/1985 | Williams | 524/100 |
| 4,789,698 | 12/1988 | Bonten et al. | 524/100 |
| 5,482,985 | 1/1996 | Baierweck et al. | 524/101 |

FOREIGN PATENT DOCUMENTS

| | | |
|---|---|---|
| 241 702 | 10/1987 | (EP) . |
| 500 190 | 8/1992 | (EP) . |

OTHER PUBLICATIONS

*Patent Abst. of Japan*, vol. 3, No. 43 (C–042), Apr. 13, 1979 (English abstract of JP 54016565).

*Primary Examiner*—James J. Seidleck
*Assistant Examiner*—U. K. Rajguru
(74) *Attorney, Agent, or Firm*—Keil & Weinkauf

(57) ABSTRACT

Flame-retardant thermoplastic molding compositions comprise

A) from 40 to 98% by weight of a thermoplastic polyamide
B) from 1 to 40% by weight of melamine cyanurate
C) from 1 to 50% by weight of a fibrous filler which is pretreated with a silane compound and whose arithmetic mean fiber length ($d_{50}$) is from 70 to 200 μm, or of an acicular mineral filler or a mixture of these
D) from 0 to 30% by weight of other additives and processing aids where the total of the percentages by weight of components A) to D) is 100%.

7 Claims, No Drawings

FLAMEPROOF POLYAMIDE MOULDING COMPOUNDS CONTAINING MELAMINE CYANURATE

The invention relates to flame-retardant thermoplastic molding compositions comprising
- A) from 40 to 98% by weight of a thermoplastic polyamide
- B) from 1 to 40% by weight of melamine cyanurate
- C) from 1 to 50% by weight of a fibrous filler which is pretreated with a silane compound and whose arithmetic mean fiber length ($d_{50}$) is from 70 to 200 µm, or of an acicular mineral filler or mixtures of these
- D) from 0 to 30% by weight of other additives and processing aids where the total of the percentages by weight of components A) to D) is 100%.

In addition, the invention relates to the use of the novel molding compositions to produce moldings of any type, and to the resultant moldings.

JP-A 53/051 250 discloses flame-retardant polyamide molding compositions which contain melamine cyanurate and fillers. These are prepared by carrying out the polymerization of the amide-forming monomers in the presence of the fillers and of the flame retardant. JP-A 54/016 565, furthermore, discloses polyamide molding compositions with melamine cyanurate and containing fillers, where the mineral fillers are preferably intended to have a L/D ratio of 4-¼. It is also known from JP-A/118 454 that mixtures of melamine with cyanuric acid show flame-retardant action in polyamide, and these mixtures may also contain fillers.

Such molding compositions have the disadvantage that their mechanical properties, such as stiffness and strength, are unsatisfactory. The addition of glass fibers to polyamide mixtures with melamine cyanurate improves their mechanical properties, but their flame retardancy is adversely effected, since glass fibers drastically reduce flame retardancy through the effect known as wicking.

Correspondingly, EP-A 241 702 discloses that the flame retardancy of polyamide mixtures made from glass fibers with melamine cyanurate can be improved by using unsized short glass fibers (fiber length on average from 100 to 250 µm) in the mixture.

EP-A 614 933 discloses mixtures of magnesium hydroxide and melamine cyanurate for polyamides.

The known molding compositions achieve the UL 94 classification V-0 only at high total contents of flame retardant, and in addition in many applications the times of continued burning in the glow-wire test are important. The French standard NF F 16-101 demands continued burning times which are less than or equal to 2 seconds. The known molding compositions are very far from fulfilling this requirement.

In all of the patents mentioned the glass fibers used, if any are used at all, are conventional continuous fibers (rovings) or chopped fibers (fiber bundles of from 4 to 6 mm length). The distribution of glass fiber lengths in the product then results from shearing in the extruder, and although this is not mentioned it is from about 250 to 300 µm for usual processing (based on a product with 25% glass fiber content). Account has to be taken here of the fact that the average fiber length (for any given processing) generally falls as the proportion of fiber increases, since there is increased interaction between fibers in the zone where they are incorporated and therefore more fiber breakage (F. Raumsteiner, R. Theysohn, Comp. Sci. Techn. 23 (1985) 231).

It is an object of the present invention, therefore, to provide flame-retardant thermoplastic molding compositions which have good mechanical properties and good flame retardancy. In particular, the addition of sized, very short glass fibers should make it possible to achieve a level of flame retardancy which permits very short continued burning times in the glow-wire test.

We have found that this object is achieved by means of the molding compositions defined at the outset. Preferred embodiments are given in the subclaims.

Surprisingly, it has been found that the use in the product of particularly short glass fibers, especially having a certain distribution of glass fiber lengths, results in only a small but acceptable decline in mechanical properties (stiffness and strength), but markedly improved processability and flame retardancy. This is in contradiction to normal injection molding, since practically no change either in mechanical properties or in flame retardancy is observed in this range of fiber length (only at >1 mm does flowability deteriorate). It is therefore usual in the case of injection-molded products to accept a compromise if necessary between mechanical properties (increasing with fiber length) and isotropy (falling with fiber length), but the fiber length asked for is usually as high as possible.

As well as using short glass fibers, it is also possible in principle to produce short fibers through high shear in the extruder.

The novel molding compositions contain, as component A), from 40 to 98% by weight, preferably from 40 to 87% by weight and in particular from 60 to 85% by weight of a thermoplastic polyamide.

The polyamides of the novel molding coompositions generally have a relative viscosity $\eta_{rel}$, determined in a 1% strength by weight solution in 96% strength by weight sulfuric acid at 25° C., of from 1.7 to 5.0, corresponding to a K value (Fikentscher) of from 50 to 96. Preference is given to the use of polyamides having a relative viscosity of from 2.3 to 4.5, in particular from 2.5 to 4.0.

Preference is given to semicrystalline or amorphous resins having a molecular weight (weight-average) of at least 5,000, as described, for example, in the American patents 2 071 250, 2 071 251, 2 130 523, 2 130 948, 2 241 322, 2 312 966, 2 512 606 and 3 393 210.

Examples of these are polyamides derived from lactams having from 7 to 13 ring members, for example polycaprolactam, polycaprylolactam and polylaurolactam, and also polyamides obtained by reacting dicarboxylic acids with diamines.

Dicarboxylic acids which may be used are alkanedicarboxylic acids having from 6 to 12 carbon atoms, in particular from 6 to 10 carbon atoms, and aromatic dicarboxylic acids. Merely as examples, mention may be made of adipic acid, azelaic acid, sebacic acid, dodecanedioic acid and terephthalic and/or isophthalic acid.

Particularly suitable diamines are alkanediamines having from 6 to 12 carbon atoms, in particular from 6 to 8 carbon atoms, and also m-xylylenediamine, di(4-aminophenyl)

methane, di(4-aminocyclohexyl)methane, 2,2-di(4-aminophenyl)propane and 2,2-di(4-aminocyclohexyl) propane.

Preferred polyamides are polyhexamethylene adipamide, polyhexamethylene sebacamide and polycaprolactam.

Other suitable polyamides are those obtainable, for example, by condensing 1,4-diaminobutane with adipic acid at elevated temperature (nylon-4,6). Preparation processes for polyamides of this structure are described, for example, in EP-A 38 094, EP-A 38 582 and EP-A 39 524.

Other suitable polyamides are those obtainable by copolymerizing two or more of the monomers mentioned above, or mixtures of more than one polyamide in any desired mixing ratio.

Such partly aromatic, semicrystalline copolyamides are built up from:

$A_1$) from 20 to 90% by weight of units derived from terephthalic acid and hexamethylenediamine, $A_2$) from 0 to 50% by weight of units derived from ε-caprolactam, $A_3$) from 0 to 80% by weight of units derived from adipic acid and hexamethylenediamine and $A_4$) from 0 to 40% by weight of other polyamide-forming monomers, where the proportion of components ($A_2$) or ($A_3$) or ($A_4$) or mixtures of these is at least 10% by weight.

Component $A_1$) contains from 20 to 90% by weight of units derived from terephthalic acid and hexamethylenediamine.

Besides the units derived from terephthalic acid and hexamethylenediamine, the copolyamides contain units derived from ε-caprolactam and/or units derived from adipic acid and hexamethylenediamine and/or units derived from other polyamide-forming monomers.

The proportion of units derived from ε-caprolactam is at most 50% by weight, preferably from 20 to 50% by weight, in particular from 25 to 40% by weight, while the proportion of units derived from adipic acid and hexamethylenediamine is up to 80% by weight, preferably from 30 to 75% by weight and in particular from 35 to 60% by weight.

The copolyamides may also contain both units of ε-caprolactam and units of adipic acid and hexamethylenediamine; in this case it is advantageous if the proportion of units which are free from aromatic groups is at least 10% by weight, preferably at least 20% by weight. There is no particular limitation here on the ratio of units derived from ε-caprolactam and those derived from adipic acid and hexamethylenediamine.

Particularly advantageous polyamides for many applications have proven to be those having from 50 to 80% by weight, in particular from 60 to 75% by weight of units derived from terephthalic acid and hexamethylenediamine (units $A_1$), and from 20 to 50% by weight, preferably from 25 to 40% by weight of units derived from ε-caprolactam (units $A_2$).

Besides the units $A_1$) to $A_3$) described above, the partly aromatic copolyamides may contain up to 40% by weight, preferably from 10 to 30% by weight and in particular from 20 to 30% by weight of other polyamide-forming monomers $A_4$), as known from other polyamides.

Aromatic dicarboxylic acids $A_4$) have from 8 to 16 carbon atoms. Examples of suitable aromatic dicarboxylic acids are isophthalic acid, substituted terephthalic and isophthalic acids, such as 3-tert-butylisophthalic acid, polynuclear dicarboxylic acids, eg. 4,4'- and 3,3'-diphenyldicarboxylic acid, 4,4'- and 3,3'-diphenylmethanedicarboxylic acid, 4,4'- and 3,3'-diphenyl sulfone dicarboxylic acid, 1,4- and 2,6-naphthalene dicarboxylic acid and phenoxyterephthalic acid, isophthalic acid being particularly preferred.

Other polyamide-forming monomers $A_4$) may be derived from dicarboxylic acids having from 4 to 16 carbon atoms and aliphatic or cycloaliphatic diamines having from 4 to 16 carbon atoms, and also from aminocarboxylic acids and/or the corresponding lactams having from 7 to 12 carbon atoms. Merely as examples of suitable monomers of these types, mention may be made here of suberic acid, azelaic acid and sebacic acid as representatives of the aliphatic dicarboxylic acids, 1,4-butanediamine, 1,5-pentanediamine and piperazine as representatives of the diamines and caprylolactam, enantholactam, ω-aminoundecanoic acid and laurolactam as representatives of lactams or aminocarboxylic acids.

The following formulations of component (A) are particularly preferred here:

$A_1$) from 65 to 85% by weight of units derived from terephthalic acid and hexamethylenediamine and $A_4$) from 15 to 35% by weight of units derived from isophthalic acid and hexamethylenediamine or $A_1$) from 50 to 70% by weight of units derived from terephthalic acid and hexamethylenediamine, $A_3$) from 10 to 20% by weight of units derived from adipic acid and hexamethylenediamine and $A_4$) from 20 to 30% by weight of units derived from isophthalic acid and hexamethylenediamine.

If component ($A_4$) comprises symmetrical dicarboxylic acids in which the carboxyl groups are in para positions, it is advisable to build these up as ternary copolyamides with ($A_1$) and ($A_2$) or ($A_1$) and ($A_3$), since otherwise the copolyamide has an excessively high melting point and only melts with decomposition, and this is not desirable.

If component $A_4$) comprises cyclic aliphatic diamines as polyamide building blocks, particular preference is given here to the use as diamine components of bis(4-aminocyclohexyl)methane, bis(4-amino-3-methylcyclohexyl)methane, bis(4-aminocyclohexyl)-2,2-propane, bis(4-amino-3-methylcyclohexyl)-2,2-propane, cyclohexanediamine and isophoronediamine. Such partly aromatic and partially crystalline polyamides are described in DE-A 44 04 250.

Other partly aromatic copolyamides which have proven particularly advantageous are those whose triamine content is less than 0.5% by weight, preferably less than 0.3% by weight.

Partly aromatic copolyamides prepared by most known processes (cf. U.S. Pat. No. 4 603 166) have triamine contents which are above 0.5% by weight, and this gives poorer product quality and problems in continuous preparation. A triamine which may be mentioned as particularly causing these problems is dihexamethylenetriamine, which forms from the hexamethylenediamine used in the preparation.

The preferred partly aromatic copolyamides with low triamine content may be prepared by the processes described in EP-A 129 195 and 129 196.

The novel thermoplastic molding compositions contain, as component B), from 1 to 40% by weight, preferably from 3 to 30% by weight, and in particular from 5 to 25% by weight, of melamine cyanurate as flame retardant.

The melamine cyanurate used according to the invention (component B) is a reaction product from preferably equimolar amounts of melamine (formula I) and cyanuric acid and/or isocyanuric acid (formulae IIa and IIb)

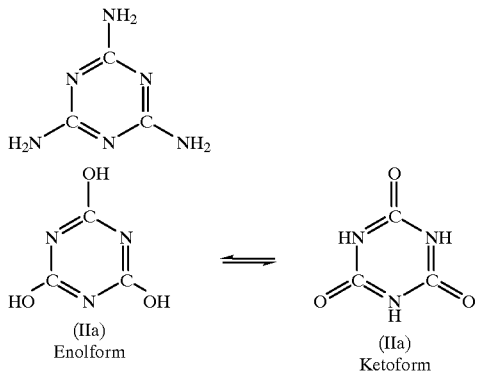

It is obtained, for example, by reacting aqueous solutions of the starting compounds at from 90 to 100° C. The product obtainable commercially is a white powder having an average particle size $d_{50}$ of from 7 to 1.5 μm.

The novel polyamide molding compositions contain, as component C), from 1 to 50% by weight, preferably from 10 to 35% by weight, and in particular from 15 to 30% by weight, of a fibrous filler whose arithmetic mean fiber length is from 70 to 200 μm, preferably from 80 to 180 μm and in particular from 100 to 150 μm. Its average diameter is generally from 3 to 30 μm, preferably from 8 to 20 μm and in particular from 10 to 14 μm.

Preferred fibrous fillers are carbon fibers, aramid fibers and potassium titanate fibers, glass fibers in the form of E glass being particularly preferred.

The fibers may be adjusted to the desired length, for example, by grinding in a ball mill, which gives a distribution of fiber lengths.

Reducing the fiber length gives a loose free-flowing material if the average fiber length is <200 μm, and this material can be mixed like a powder into the polymer. Because the fiber length is low, only a small further shortening of the fibers occurs during incorporation.

The fiber content is usually determined after ashing the polymer. To determine the fiber length distribution, the residue of ash is usually taken up in silicone oil and photographed at 20 times microscope magnification. On the images, it is possible accurately to measure the length of at least 500 fibers and to calculate the arithmetic mean ($d_{50}$) therefrom.

The $d_{50}$ is preferably less than or equal to 180 μm, preferably less than or equal to 160 μm, and in particular less than or equal to 150 μm. At the same time as the $d_{50}$ is determined, it is also possible to determine the $d_{10}$ and $d_{90}$ of the glass fiber length distribution. The significance of the $d_{10}$ here is that 10% of the glass fibers of the specimen have a length x. It has proven advantageous for the $d_{10}$ in the molding compositions according to the invention to be less than or equal to 60 μm, preferably less than or equal to 55 μm, and for the $d_{90}$ to be less than or equal to 350 μm, preferably less than or equal to 290 μm.

The fibrous fillers are pretreated with a silane compound on their surface for better compatibility with the thermoplastic polyamide.

Suitable silane compounds are those of the formula III

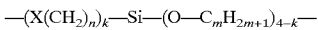

where:

X is $NH_2-$;

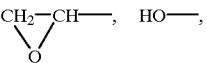

n is an integer from 2 to 10, preferably 3 or 4
m is an integer from 1 to 5, preferably 1 or 2
k is an integer from 1 to 3, preferably 1.

Preferred silane compounds are aminopropyltrimethoxysilane, aminobutyltrimethoxysilane, aminopropyltriethoxysilane, aminobutyltriethoxysilane and the corresponding silanes which have a glycidyl group as substituent X.

The silane compounds are generally used for surface coating in amounts of from 0.05 to 5% by weight, preferably from 0.5 to 1.5% by weight, and in particular from 0.8 to 1% by weight (based on C).

For the purposes of the invention, an acicular mineral filler is a mineral filler having strongly developed acicular character. An example of these is acicular wollastonite. The mineral preferably has an L/D (length to diameter) ratio of from 8:1 to 35:1, preferably from 8:1 to 11:1. If desired, the mineral filler may be pretreated with the silane compound mentioned above; however, the pretreatment is not absolutely essential.

Besides the essential components A), B) and C), the novel molding compositions may contain usual additives and processing aids D). The proportion of these is generally up to 30% by weight, preferably up to 10% by weight, based on the total weight of the components.

Examples of usual additives are stabilizers and oxidation inhibitors, agents to counteract decomposition by heat and by ultraviolet light, lubricants, mold-release agents, dyes, pigments and plasticizers, and also impact-modifying polymers (rubbers).

Examples of oxidation inhibitors and heat stabilizers which may be added to the thermoplastic compositions according to the invention are halides selected from the class consisting of halides of metals of group I of the Periodic Table, eg. lithium, sodium and potassium halides, and copper(I) halides, eg. chlorides, bromides and iodides, or mixtures of these. It is moreover possible to use sterically hindered phenols, secondary aromatic amines, hydroquinones, substituted representatives of this class and mixtures of these compounds, preferably in a concentration of up to 1% by weight, based on the weight of the mixture.

Examples of UV stabilizers are substituted resorcinols, sterically hindered phenols, salicylates, benzotriazols and benzophenones, which may usually be used in amounts of up to 2% by weight.

Examples of lubricants and mold-release agents, which may usually be added in amounts of up to 1% by weight of the thermoplastic composition, are long-chain fatty acids or derivatives of these, for example stearic acid, stearyl alcohol, alkyl stearates and stearamides, and also esters of pentaerythritol with long-chain fatty acids.

It is also possible to use, as colorants, organic dyes, such as nigrosin, and pigments, such as titanium dioxide, cadmium sulfide, cadmium selenide, phthalocyanines, ultramarine blue and carbon black.

Nucleating agents which may be used are sodium phenylphosphinate, alumina, silica, nylon-2,2, and also preferably talc, usually in amounts of up to 1% by weight.

Examples of plasticizers are dioctyl phthalate, dibenzyl phthalate, butyl benzyl phthalate, hydrocarbon oils, N-(n-butyl)-benzenesulfonamide and o- and p-tolylethylsulfonamide. The amounts are usually up to 15% by weight.

The novel molding compositions may be prepared by processes known per se. In a preferred embodiment, the preparation entails adding component B), and also C), to the melt of component A).

It is expedient to use extruders for this purpose, eg. single-screw or twin-screw extruders, or to use other conventional plasticating apparatus, such as Brabender mixers or Banbury mixers.

The plastic mixtures may subsequently be subjected to a further thermal treatment, ie. a postcondensation in the solid phase. The molding composition, in the form appropriate to the process, is conditioned in a conditioning apparatus, for example a tumbling mixer or a continuous or batch conditioning tube, until the desired viscosity number VN or relative viscosity $\eta_{rel}$ of the polyamide is reached. The temperature range for the conditioning depends on the melting point of the pure component A). Preferred temperature ranges are below the respective melting point of A) by from 5 to 50° C., preferably by from 20 to 30° C. The process is preferably carried out in an inert gas atmosphere, preferred inert gases being nitrogen and superheated steam.

The residence times are generally from 0.5 to 50 hours, preferably from 4 to 20 hours. Moldings are then produced from the molding compositions using conventional apparatus.

In another preferred method of preparation of the novel molding compositions, components A) and C) are compounded, the amount of C) being greater than 40% by weight (based on A) and C)), and preferably greater than 45% by weight (batch). This concentrate (batch) is then compounded with A) and B), and also if desired D), in suitable mixing apparatus.

The novel molding compositions have good processability, and also good flame retardancy combined with a good spectrum of mechanical properties. They are therefore suitable for producing fibers, films and moldings of any type used in particular in the electrical sector as circuit breakers, auxiliary switches, relay switches and plug connectors.

EXAMPLES

The following components were used:
Component A:
A1: Poly-ε-caprolactam with a viscosity number VN, measured as 0.5% strength solution in 96% strength by weight $H_2SO_4$ at 25° C., of 145 ml/g; Ultramid® B3 from BASF AG.
A2: Nylon-6,6 with a VN of 151 ml/g, Ultramid® A3 from BASF AG.
Component B: Melamine cyanurate with an average particle size of 1.5 μm.
Component C:
C1: Ground glass fiber (E glass), diameter 14 μm, aminosilane size.
C2: Ground glass fiber (E glass), diameter 14 μm, not silanized.
C3: Chopped glass fiber, diameter 14 μm, fiber length 6000 μm, aminosilane size
C4: Chopped glass fiber: diameter 14 μm, fiber length: 3.5 cm; aminosilane size
C5: Wollastonite with an average particle size of 3.5 μm; L/D ratio: 9:1.
C6: Wollastonite with an average particle size of 3.5 μm: L/D ratio: 5:1.
C7: Magnesium hydroxide with aminosilane size (Magnifin® H10B from Martinswerke GmbH).
Preparation of the molding compositions Examples 1 to 3 and 5 and Comparative Examples 1* to 5*

Component A, melamine cyanurate and the respective component C (see Table) were compounded in a twin-screw extruder (ZSK 40 from Werner & Pfleiderer) at 120 rpm and a throughput of 20 kg/h (processing temperatures: A1=260° C.; A2=280° C.). The mixture was extruded, cooled in a water bath, granulated and dried under reduced pressure at 80° C. for 10 hours.

Example 4

Nylon-6 (component A1) was compounded under the above conditions at 260° C. with 50% by weight of C4, granulated and dried. 40% by weight of this batch (concentrate) was melted again in the extruder at 260° C. with nylon-6 and melamine cyanurate, intimately mixed, cooled, granulated and dried.

Determination of the average glass fiber length and of the distribution of glass fiber lengths in the granules obtained:

A 10 g specimen was ashed at 600° C. for 10 minutes, the residue taken up in silicone oil and 1 drop of the emulsion applied to a microscope slide and photographed at 20 times magnification. Image analysis equipment (IBAS 2000 from Kontron) was used to scan 15 complete images (about 2000 fibers). Using an automatic evaluation program, a count was made from the 15 images and the $d_{10}$, $d_{50}$ and $d_{90}$ of the glass fiber length distribution were calculated.

The molding compositions were injection molded at 260° C. to give test specimens, on which the following measurements were carried out:

Tensile strength was measured according to DIN 53455, modulus of elasticity according to DIN 53457, elongation at break according to DIN 53455 and impact strength according to ISO 179/eU. The glow-wire test took place according to IEC 695-21, and the thickness of the test specimen is given as 1, 2 or 3 mm. A 1/16" flammability strip was used for the UL 94 flammability test.

The formulations of the molding compositions and the results of the measurements are given in the table.

TABLE

| Example | | 1 | 2 | 3 | 1* | 4 | 2* | 3* | 5 | 4* | 5* |
|---|---|---|---|---|---|---|---|---|---|---|---|
| Component A | % by weight | 65 A1 | 60 A1 | 65 A2 | 65 A1 | 65 A1 | 65 A1 | 65 A1 | 65 A1 | 65 A1 | 55 A1 |
| Melamine cyanurate B | % by weight | 15 | 20 | 15 | 15 | 15 | 15 | 15 | 15 | 15 | 15 |
| Mg(OH)$_2$ | % by weight | | | | | | | | | | 10 C7 |
| Glass fiber | % by weight | 20 C1 | 20 C1 | 20 C1 | 20 C2 | 20 C4 | 20 C3 | 20 C4 | 20 C5 | | 20 C4 |
| Mineral | % by weight | | | | | | | | | 20 C6 | |
| GF length distribution | | | | | | | | | | | |
| d$_{10}$ | μm | 51 | 45 | 40 | 45 | 42 | 80 | 80 | — | — | 83 |
| d$_{50}$ | μm | 144 | 135 | 138 | 155 | 137 | 230 | 280 | — | — | 240 |
| d$_{90}$ | μm | 283 | 248 | 270 | 253 | 227 | 400 | 800 | — | — | 750 |
| Density | g/cm$^3$ | 1.32 | | | | 1.34 | | 1.32 | 1.32 | | 1.42 |
| Flammability test: UL 94: | | | | | | | | | | | |
| 1/16" | | V-2 | V-0 | V-2 | V-2 | V-2 | V-2 | V-2 | V-2 | V-2 | V-2 |
| Glow-wire test: | | | | | | | | | | | |
| 750° C. 1/2/3 mm | | +/+/+ | +/+/+ | +/+/+ | +/+/+ | +/+/+ | +/+/+ | −/−/+ | +/+/+ | +/+/+ | +/+/+ |
| 850° C. 1/2/3 mm | | +/+/+ | +/+/+ | +/+/+ | +/+/+ | +/+/+ | −/−/+ | −/−/− | +/+/+ | +/+/+ | +/+/+ |
| 960° C. 1/2/3 mm | | +/+/+ | +/+/+ | +/+/+ | +/+/+ | +/+/+ | −/−/− | −/−/− | +/+/+ | +/+/+ | +/+/+ |
| Continued burning time at 960° C./3 mm | [sec] | 1 | 0 | 2 | 2 | 1 | | | | | 24 |
| Modulus of elasticity | [MPa] | 8500 | 6300 | 7500 | 6700 | 7300 | 7500 | 8200 | 7200 | 5000 | 10400 |
| Tensile strength | [MPa] | 110 | 90 | 103 | 85 | 109 | 120 | 132 | 95 | 75 | 127 |
| Elongation at break | [%] | 3.0 | 2.4 | 1.9 | 2.1 | 3.4 | 3.2 | 3.0 | 2.9 | 4.1 | 1.6 |
| Impact strength ISO 179/eU | [kJ/m$^2$] | 35 | 25 | 29 | 26 | 56 | 58 | 62 | 47 | 40 | 25 |

Comparative examples:
1* Comparative example according to EP-A 241 702
4* Comparative example according to JP-A 54/016 565
5* Comparative example according to EP-A 614 933

We claim:
1. A flame-retardant thermoplastic molding composition consisting essentially of
A) from 40 to 98% by weight of a thermoplastic polyamide
B) from 1 to 40% by weight of melamine cyanurate
C) from 1 to 50% by weight of a fibrous filler which is pretreated with a silane compound and whose arithmetic mean fiber length (d$_{50}$) is from 70 to 200 μm and which has a d$_{10}$ less than or equal to 60 μm and a d$_{90}$ less than or equal to 350 μm, or of an acicular mineral filler with an L/D ratio of from 8:1 to 35:1 or a mixture of these
D) from 0 to 30% by weight of other additives and processing aids where the total of the percentages by weight of components A) to D) is 100% selected from the group consisting of stabilizers and oxidation inhibitors, agents to counteract decomposition by heat and by ultraviolet light, lubricants, mold-release agents, dyes, pigments, plasticizers and impact modifying polymers.
2. A flame-retardant thermoplastic molding composition as claimed in claim 1, in which the fibrous filler is built up from glass fibers, carbon fibers, potassium titanate fibers or aramid fibers or mixtures of these.
3. A flame-retardant thermoplastic molding composition as claimed in claim 1, in which the arithmetic mean fiber length of components C) (d$_{50}$) is from 80 to 180 μm.
4. A flame-retardant thermoplastic molding composition as claimed in claim 1, in which the diameter of the fibrous filler is from 3 to 30 μm.
5. A flame-retardant thermoplastic molding composition as claimed in claim 1, where the silane compound has the formula I

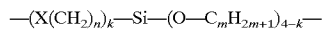

where the substituents are as follows:
X is NH$_2$;

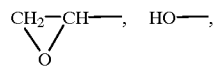

n is an integer from 2 to 10, preferably 3 or 4
m is an integer from 1 to 5, preferably 1 or 2
k is an integer from 1 to 3, preferably 1.
6. A flame-retardant thermoplastic molding composition as claimed in claim 1, in which component C) has a distribution of glass-fiber lengths having a d$_{10}$ of less than or equal to 60 μm, a d$_{50}$ of less than or equal to 180 μm and a d$_{90}$ of less than or equal to 350 μm.
7. A molding obtainable from the thermoplastic molding composition as claimed in claim 1.

* * * * *